United States Patent
Hagstrom

(10) Patent No.: US 10,284,736 B2
(45) Date of Patent: May 7, 2019

(54) PAPER SHEET FEED SYSTEM FOR PORTABLE PRINTER, SCANNER, AND COPIER

(71) Applicant: Primera Technology, Inc., Plymouth, MN (US)

(72) Inventor: Erick Hagstrom, Wayzata, MN (US)

(73) Assignee: Primera Technology, Inc., Plymouth, MN (US)

(*) Notice: Subject to any disclaimer, the term of this patent is extended or adjusted under 35 U.S.C. 154(b) by 2 days.

(21) Appl. No.: 15/496,798

(22) Filed: Apr. 25, 2017

(65) Prior Publication Data
US 2017/0230522 A1    Aug. 10, 2017

Related U.S. Application Data

(62) Division of application No. 14/986,946, filed on Jan. 4, 2016, now Pat. No. 9,669,632.

(60) Provisional application No. 62/099,299, filed on Jan. 2, 2015.

(51) Int. Cl.

| | |
|---|---|
| *H04N 1/00* | (2006.01) |
| *B41J 2/175* | (2006.01) |
| *B41J 13/00* | (2006.01) |
| *B41J 25/00* | (2006.01) |
| *B41J 2/165* | (2006.01) |
| *B41J 29/02* | (2006.01) |
| *B41J 29/38* | (2006.01) |
| *B41J 11/00* | (2006.01) |
| *H04N 1/12* | (2006.01) |

(52) U.S. Cl.
CPC ...... *H04N 1/00525* (2013.01); *B41J 2/16508* (2013.01); *B41J 2/16538* (2013.01); *B41J 2/16547* (2013.01); *B41J 2/1752* (2013.01); *B41J 2/17526* (2013.01); *B41J 11/006* (2013.01); *B41J 11/007* (2013.01); *B41J 13/0018* (2013.01); *B41J 25/001* (2013.01); *B41J 29/023* (2013.01); *B41J 29/38* (2013.01); *H04N 1/0053* (2013.01); *H04N 1/00535* (2013.01); *H04N 1/00538* (2013.01); *H04N 1/121* (2013.01); *H04N 2201/0094* (2013.01)

(58) Field of Classification Search
CPC ................ B41J 2/16508; B41J 2/16538; B41J 2/16547; B41J 2/1752; B41J 2/17526; B41J 11/006; B41J 2/007; B41J 13/0018; H04N 13/0018; H04N 1/00525
See application file for complete search history.

(56) References Cited

U.S. PATENT DOCUMENTS

| | | | |
|---|---|---|---|
| 6,543,868 B2 | 4/2003 | Cooper et al. | |
| 7,815,288 B2 | 10/2010 | Inamura et al. | |
| 2006/0244796 A1 | 11/2006 | Sekino et al. | |
| 2013/0076831 A1 | 3/2013 | Ishida et al. | |
| 2014/0152745 A1 | 6/2014 | Park | |

(Continued)

*Primary Examiner* — Lamson Nguyen
(74) *Attorney, Agent, or Firm* — Westman, Champlin & Koehler, P.A.; Z. Peter Sawicki; Amanda M. Prose

(57) ABSTRACT

A compact and portable printer, scanner and copier having dimensions and a housing allowing the device to be portable for travel with a laptop computer or other tablet or portable computing device. The three in one printer has a pivotal carriage for linear and rotational movement of the carriage and an ink cartridge. The printer also has an easily accessible removable ink cartridge maintenance system.

9 Claims, 19 Drawing Sheets

(56) References Cited

U.S. PATENT DOCUMENTS

2016/0198056 A1* 7/2016 Hagstrom ............. B41J 29/023
  347/38

\* cited by examiner

FIG. 13A
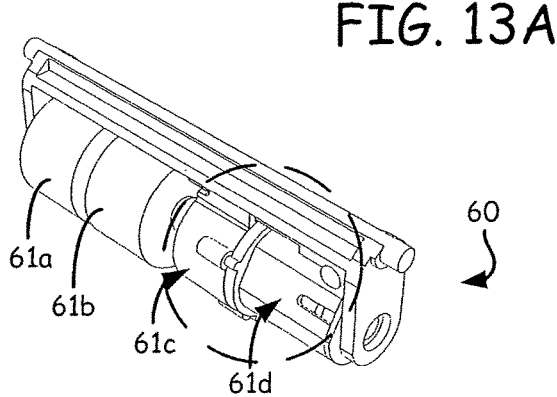
FIG. 13B
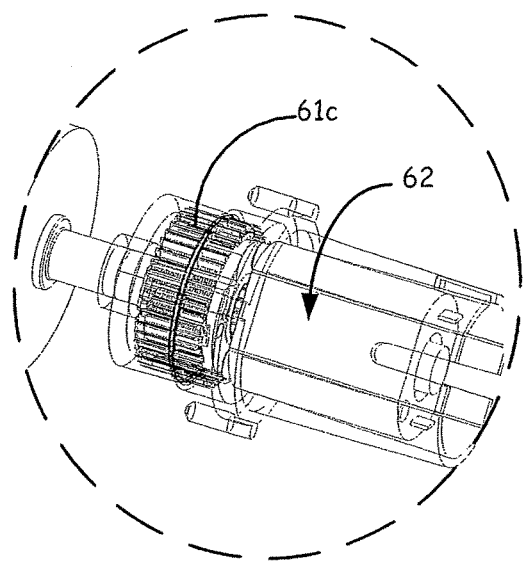
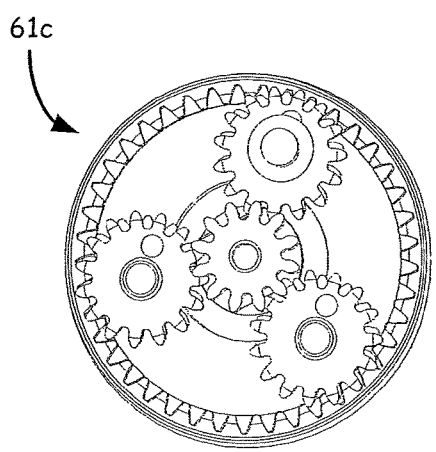
FIG. 13C

FIG. 26A
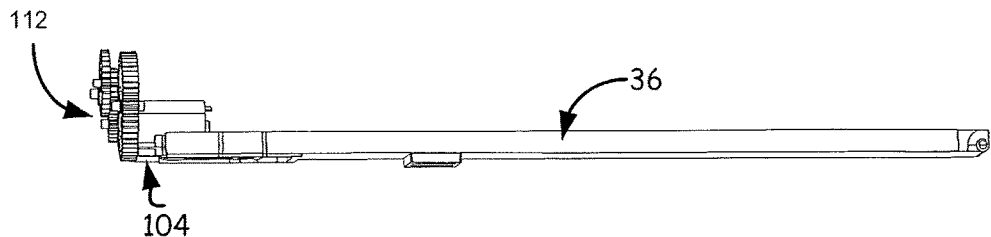
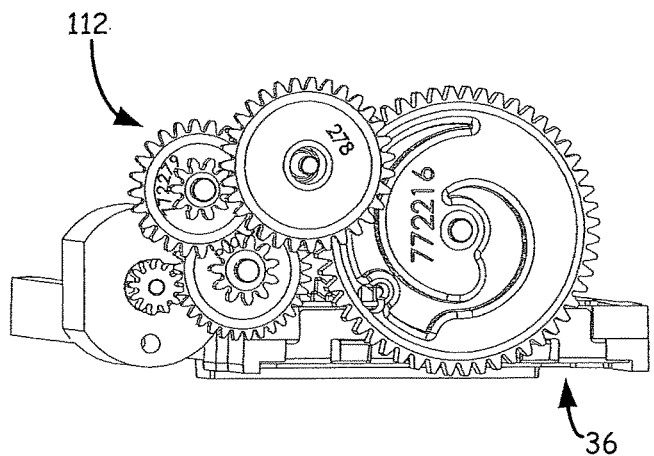
FIG. 26B
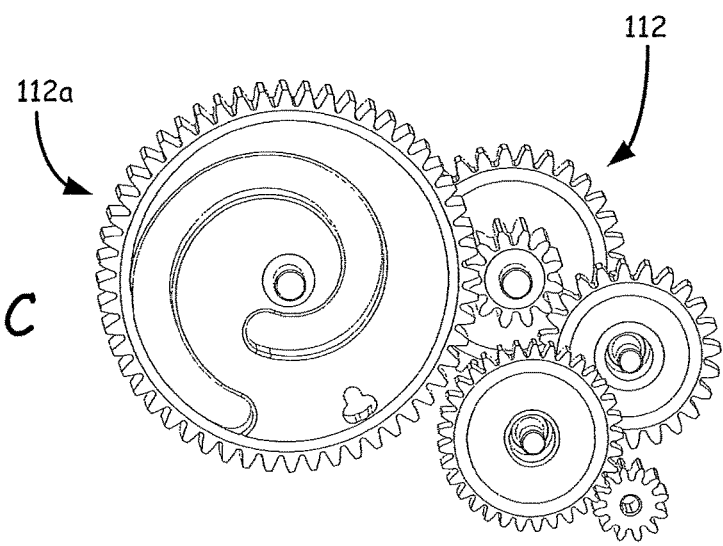
FIG. 26C

PAPER SHEET FEED SYSTEM FOR PORTABLE PRINTER, SCANNER, AND COPIER

CROSS-REFERENCE TO RELATED APPLICATION

The present application is a divisional of U.S. patent application Ser. No. 14/986,946, filed Jan. 4, 2016, which is based on and claims the benefit of U.S. provisional patent application Ser. No. 62/099,299 filed Jan. 2, 2015, the contents of which are hereby incorporated by reference in their entireties.

BACKGROUND

The present invention relates to a compact and portable device for printing, scanning and/or copying documents.

Lap top computers and other portable computing devices including tablets and pads are increasingly common and are convenient travel accessories. While lap tops are convenient when travelling, allowing a user to continue working when away from the home or office, it is generally difficult for a user to find a device capable of printing documents when away from home or the office. While some hotels are equipped with printers for general use by guests, many hotels do not offer this service and a user must locate a store location offering services directed to printing, scanning or copying needs.

It is generally required then for a user to save documents or work products to an external device and to locate a printer in a hotel or at a retail location equipped for printing, copying and scanning items for others. Alternatively, a user may electronically transmit a copy of a document or work product to a hotel service for printing the documents or to a retail location for printing the documents. However, this requires the user to travel to another location to retrieve printed items and to make sure access to their documents or work product by another device is available.

Further, when travelling where expenses are being reimbursed, for example, a business trip, a user must typically organize and save all of their accumulated physical paper receipts so as to provide them to their employer upon their return.

SUMMARY

The present disclosure is directed to a multi-function compact device capable of printing, scanning and copying documents, the device having a reduced overall size. The device is thus portable, similarly to a lap top computer, tablet, pad or other personal computing device. The multi-function device is also configured for connection to, or communication with, a computing device to allow a user to selectively print, scan and/or copy documents. The multi-function device may be reduced in overall size by incorporating any one or more of the aspects of the present disclosure described below. Each aspect of the disclosure allows for a reduction in the overall dimensions of the device and/or increase in efficiency and performance of the multi-function device.

One aspect of the present disclosure relates to a carriage for holding an ink cartridge. The carriage is extensible, allowing the carriage to have an extended or contracted length and is further pivotal about an axis for selective positioning of the carriage. The carriage comprises an extensible or displaceable frame section and a fixed frame section where the extensible or displaceable frame section is slidably connected to the fixed frame section to form an open area configured for receiving an ink cartridge. The displaceable frame section is slidable along a horizontal axis such that the length of the open area of the carriage is slidably adjustable. The carriage further comprises an actuation lever that may be pivotally or otherwise rotatably secured to at least one of the displaceable or fixed frame sections for pivoting or rotating the lever about a first axis. A slidable connection having at least one component for providing a bias force, for example, a spring, allows the carriage to have a selectively adjustable length that may be secured an extended or compacted position. A bearing is configured for pivotal connection to the carriage where the carriage is pivotal about a second axis, the second axis may be perpendicular to the first axis.

Another aspect of the present disclosure relates to a removable maintenance system for a printer comprising a substantially flat tray having a textured surface and configured to receive an absorbent pad. An upwardly protruding ledge positioned on the tray and extending horizontally across the tray and a spring loaded frame for receiving a cap allow for maintenance and storage of an ink cartridge. The tray is configured for accessible connection with a surface of a printer below a print head, the connection being removable such that the tray is disposable and a replacement tray easily inserted. The tray is secured to the surface in a manner that may allow the tray to be in a lowered position away from an ink cartridge or a raised position proximate the ink cartridge, wherein an assembly is configured to selectively raise the tray.

Yet another aspect of the present disclosure relates to a compact and portable device capable of printing, scanning and copying functions comprising a housing having a base and a removable lid, where the lid is further adapted with a cover configured for opening and closing over the device. The cover is pivotally attached to the lid for opening and closing wherein the lid provides an access opening to function components positioned within the housing. The lid is further configured with a paper support tray, the tray being extensible from the cover to extend a height above the open cover and to provide support for a paper supply. The support tray may be pivotally attached to an inner surface of the lid and rotatable from a compact to an open position, or slidably connected to enable movement from a lowered to a raised position. A carriage for receiving an ink cartridge may be configured for rotatable movement about a first axis and linear movement about a second, perpendicular axis, the carriage being disposed within the housing. The device further comprises at least two motors wired in series wherein the two motors may be of a reduced size. The device also comprises a removable maintenance system having a disposable or replaceable tray and absorbent component.

BRIEF DESCRIPTION OF THE DRAWINGS

FIG. 13A is a perspective view of an auto sheet feeder roller of the device.

FIG. 13B is a view of a drive gear assembly of the auto sheet feeder of the device.

FIG. 13C is a side view of the drive gear assembly of the auto sheet feeder of the device.

FIG. 26A is a side view of a drive gear assembly for the maintenance tray of the device.

FIG. 26B is a front view of a drive gear assembly for the maintenance tray of the device.

FIG. 26C is a back view of the drive gear assembly for the maintenance tray of the device

DETAILED DESCRIPTION

The device of the present disclosure is a compact and portable printer also configured for scanning and copying documents. The combination printer, scanner and copier of the present invention includes a compact housing for the printer, scanner and copier function and power components and an ink cartridge carrier configured for both linear and rotary movement of the cartridge, which allow the device to be portable and to have significantly compact dimensions. In order to achieve the compact construction, the device disclosed herein has a number of features, each feature contributing to the compact design and each such feature is considered patentable on its own.

FIGS. 1-4 illustrate the compact printer, scanner and copier of the present disclosure. The device includes a housing 10 where the printing, scanning and copying function and power components are disposed therein. The housing 10 is formed by a base frame 12 and a cover frame 14. A cover 15 is pivotally secured to the cover frame 14 and serves a dual purpose of covering the internal components when the device is not in use and also provides a paper feed support when opened. The housing 10 may be constructed of a plastic material or other lightweight but durable material.

Figure 1:
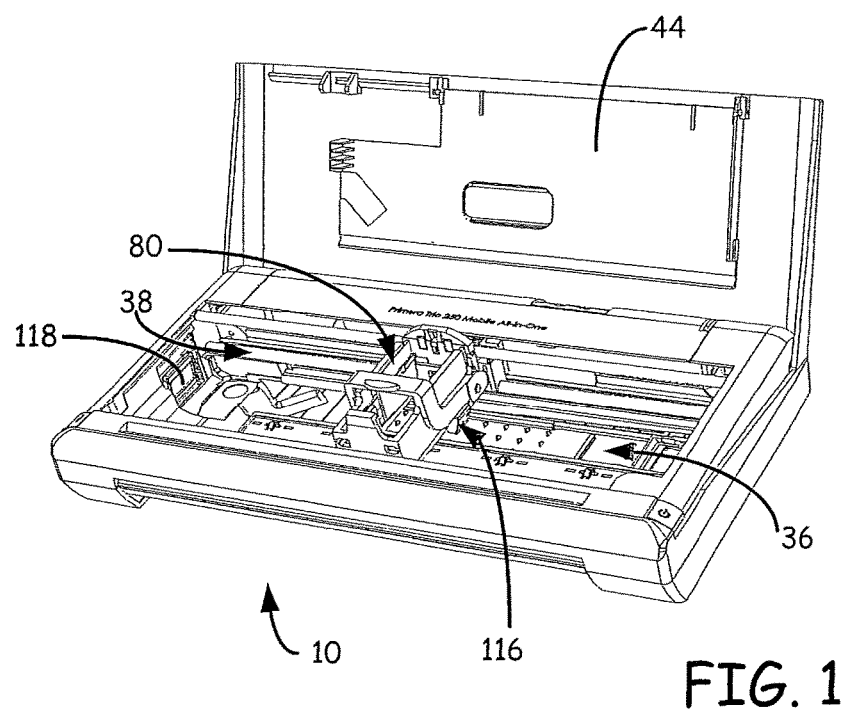
FIG. 1 is a perspective view of a compact printer, scanner and copier device of the present disclosure.
Figure 2:
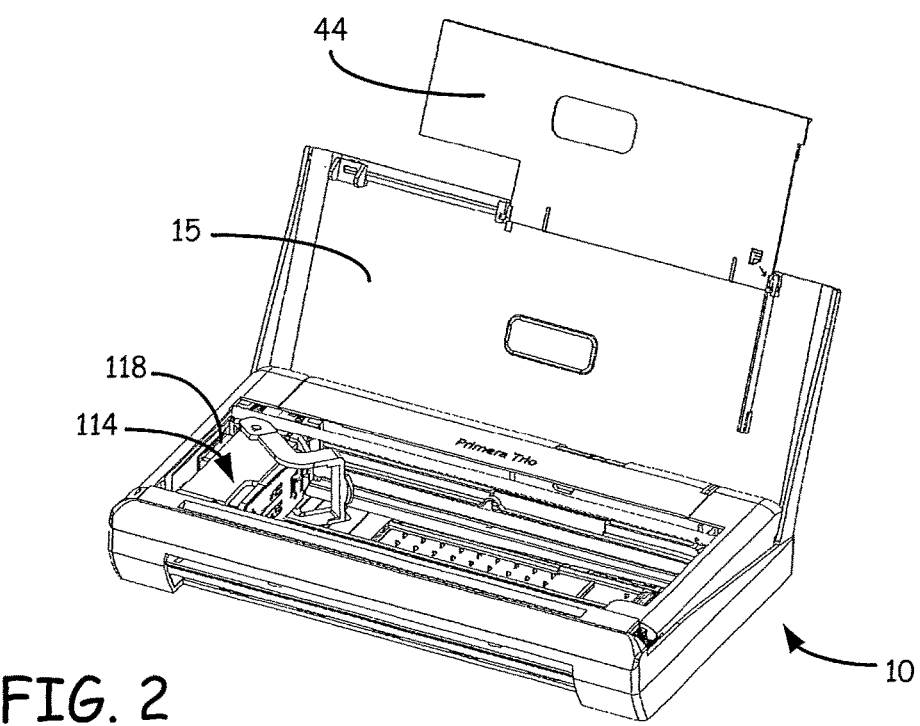
FIG. 2 is a perspective view of a print head in a stowed position in the device.
Figure 3A:
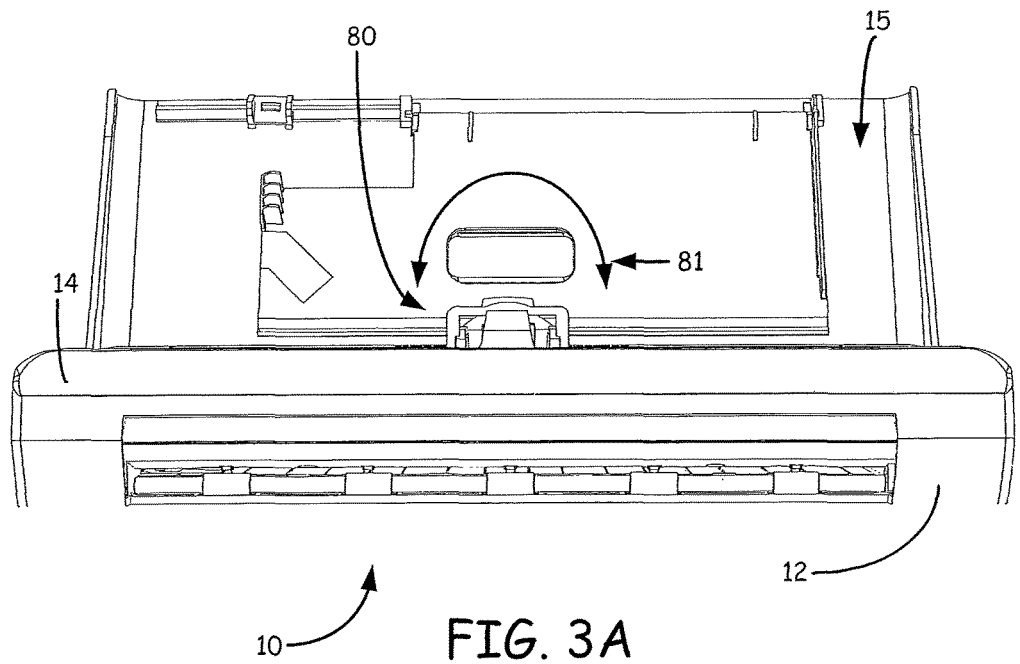
FIG. 3A is a front view of the device.
Figure 3B:
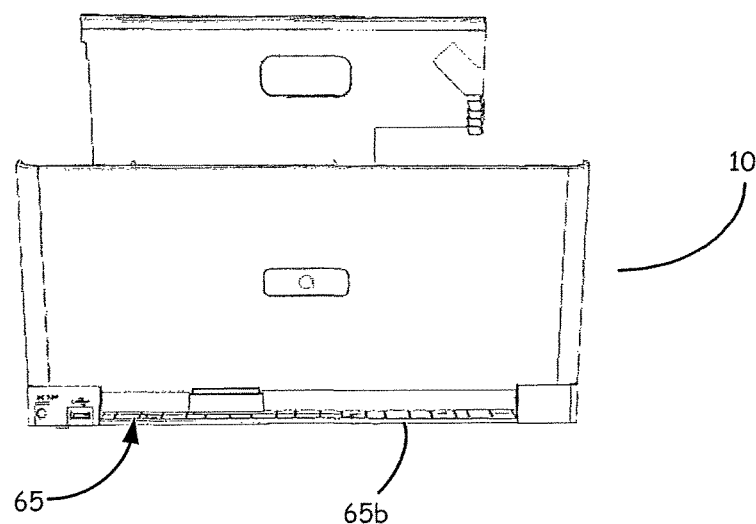
FIG. 3B is a back view of the device.
Figure 4:
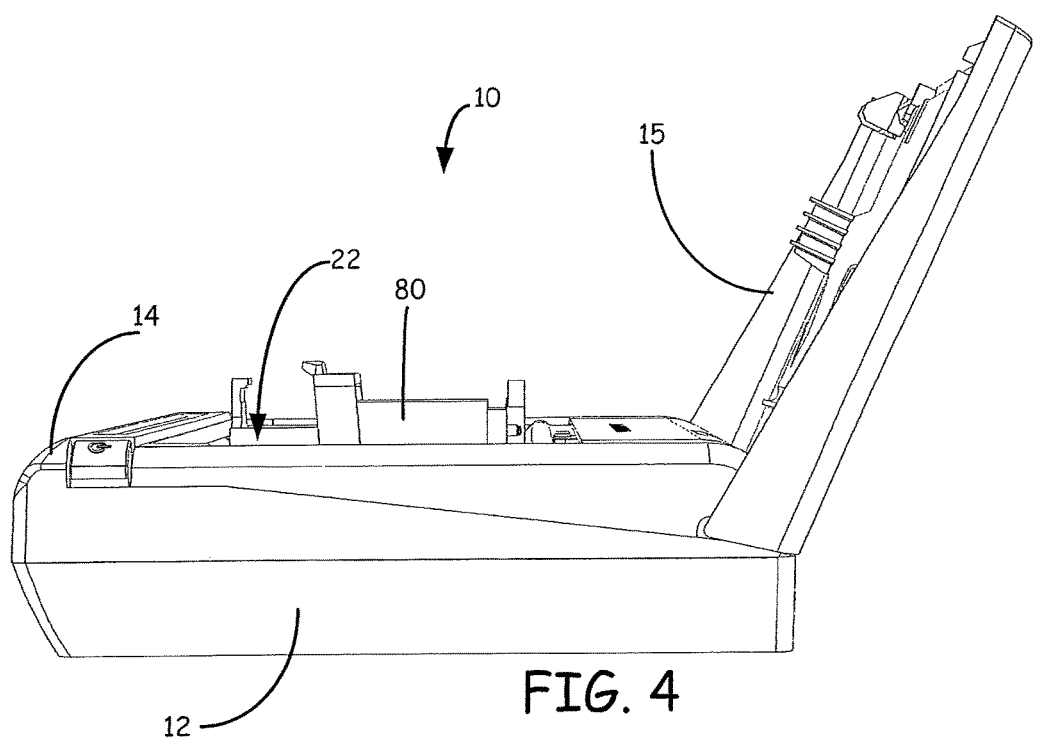
FIG. 4 is a side view of the device.
Figure 5:
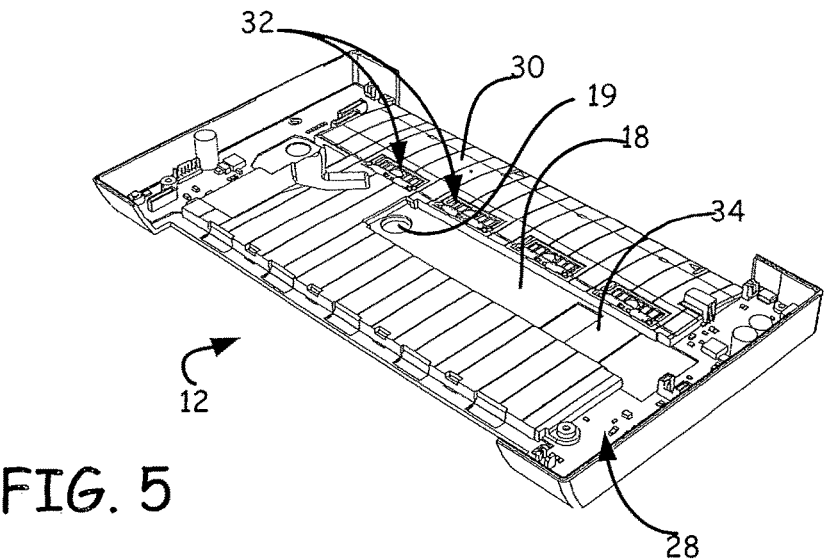
FIG. 5 is a perspective view of a base frame of the device.
Figure 6:
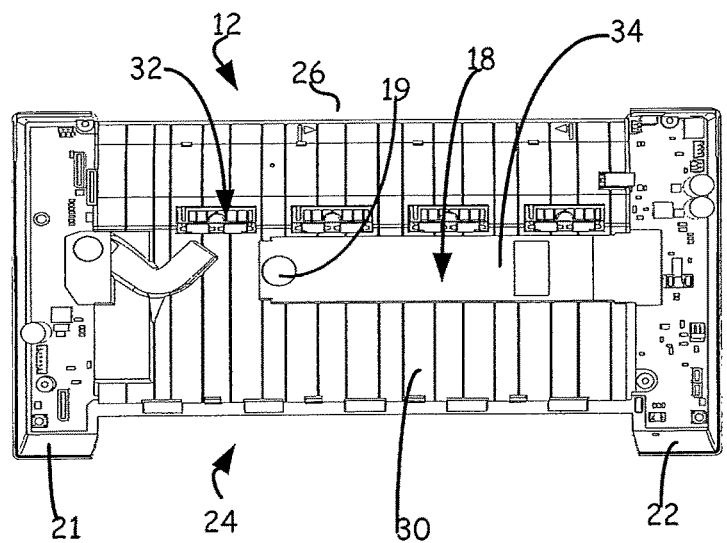
FIG. 6 is a top view of the base frame of the device
Figure 7:
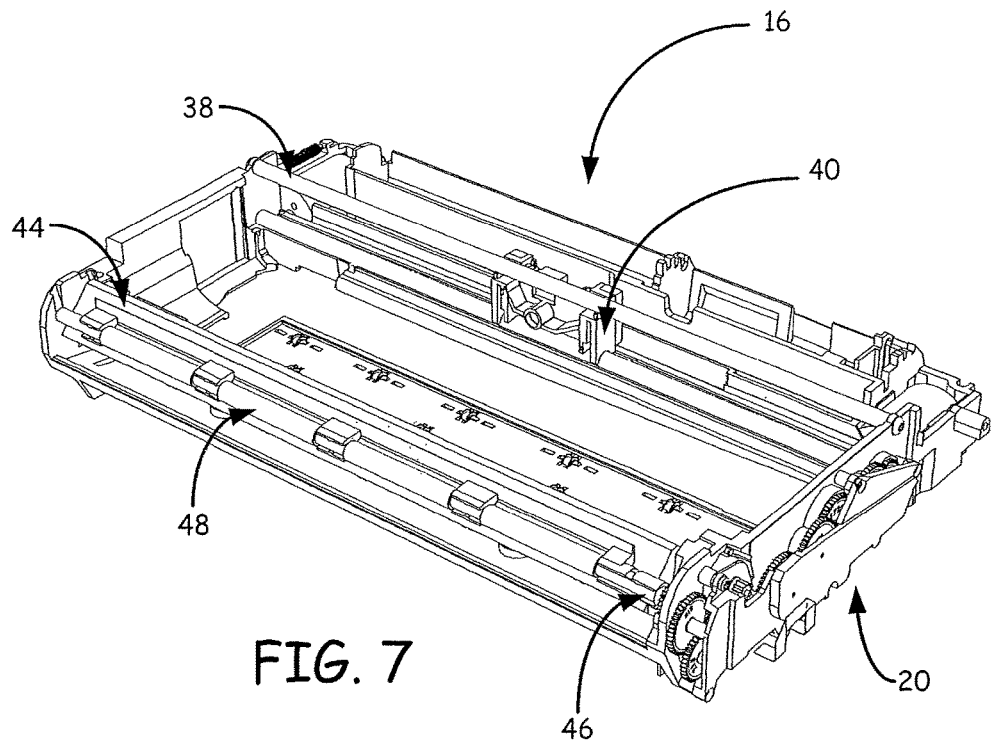
FIG. 7 is a perspective view of a main frame of the device.
Figure 8:
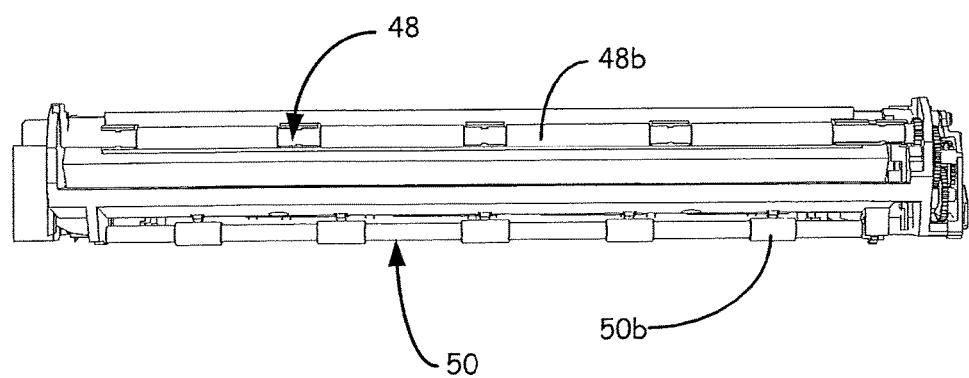
FIG. 8 is a front view of the main frame of the device.
Figure 9:
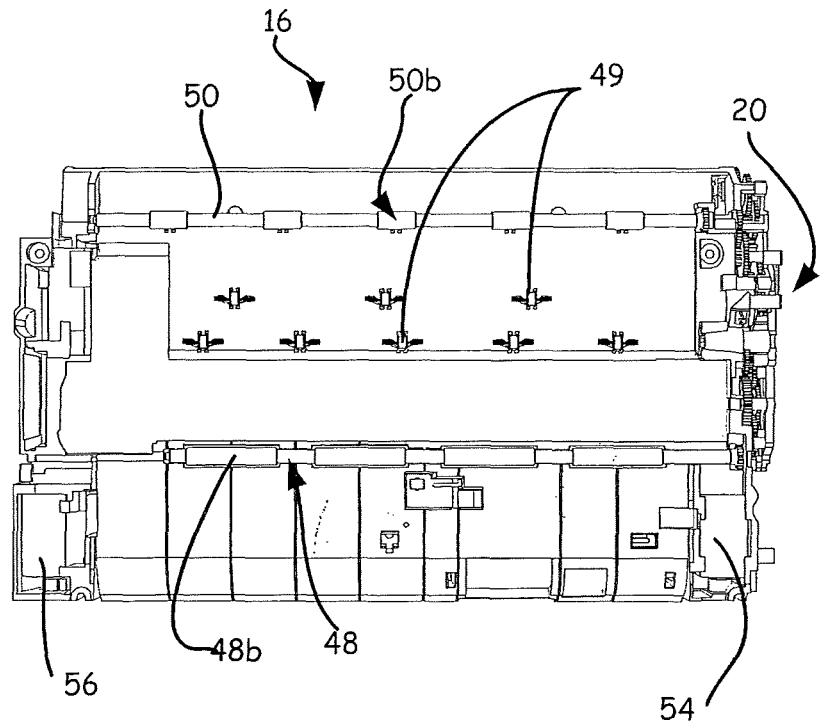
FIG. 9 is a bottom view of the main frame of the device.
Figure 10:
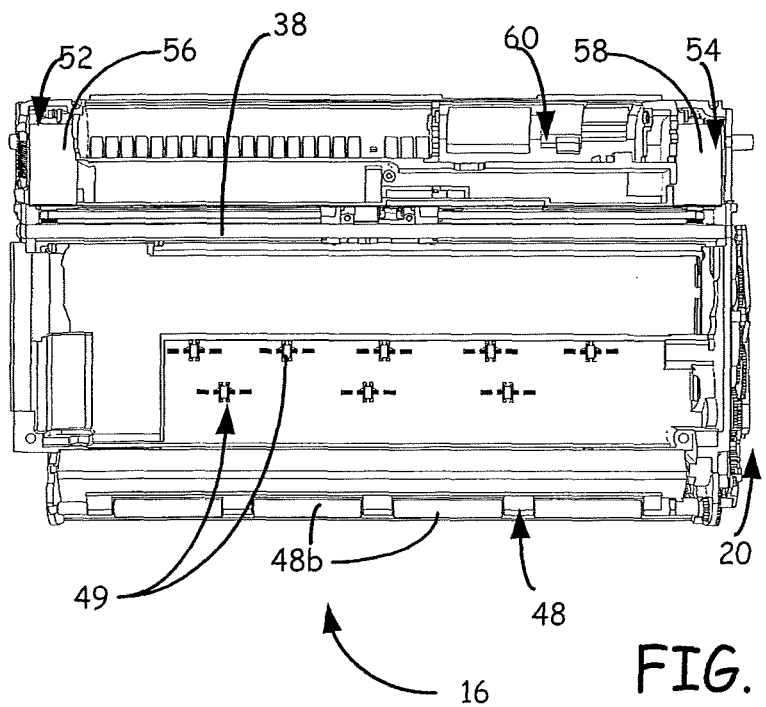
FIG. 10 is a top view of the main frame of the device.

The base frame 12 is illustrated in further detail in FIGS. 5-6 and is configured for supporting a main printing frame 16. The base frame 12 is a substantially flat base area 18, generally in the shape of a rectangle. The base frame 12 is integrally adapted along the base area 18 with two upturned edges 21 and 22 on opposing sides of the frame 12. The two opposing edges 21 and 22 are side walls that provide an outer perimeter to the device and are configured for connection with the cover frame 14. The side walls 21 and 22 extend around a corner of the base area 18 a short distance along the front 24 and back 26 horizontal lengths of the base area 18 allowing the front 24 and back 26 lengths of the base to be substantially unobstructed along the length. Open lengths provide a media inlet and media outlet in the base 12 allowing paper to be fed into and out of the housing 10.

A circuit board 28 and corresponding circuit board cover 30 are secured on the inner face of the base area 18. A plurality of pinch rollers 32 are spaced horizontally along a top surface of the cover 30. A print sensor and sensor holder are also secured to the top surface of the cover 30. The cover is also adapted with a generally rectangular opening 34 exposing base area 18 and an aperture 19 in base area 18 and providing a space configured to receive an ink maintenance system 36, which will be discussed in further detail below. The side walls 21 and 22 of the base frame 12 are also adapted with apertures for supporting power connections as well as USB ports. The opposing side areas of the base area 18 are configured to receive various operating components for enabling any of the functions of the device.

Figure 11A:
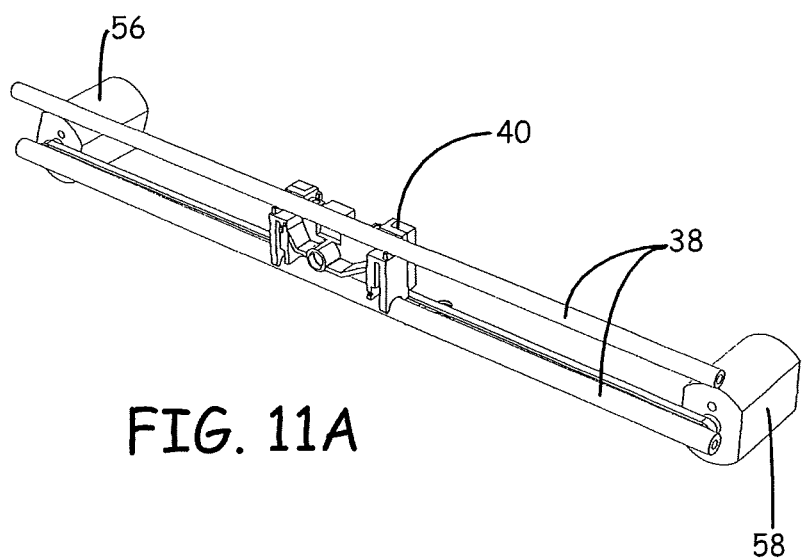
FIG. 11A is a front view of a carrier belt, carriage bracket, shaft and drive components isolated from the main frame of the device.
Figure 12A:
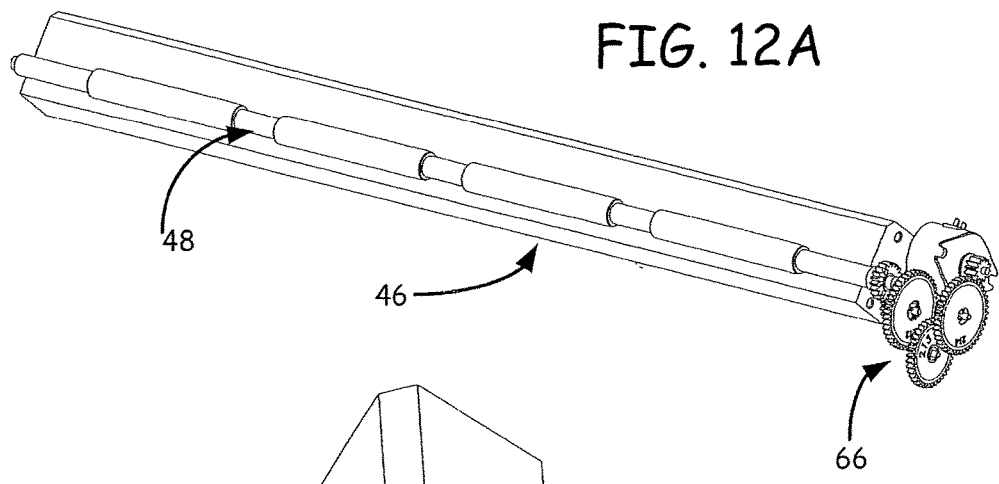
FIG. 12A is a perspective view of the scanner drive roller gear assembly of the gear train assembly of the device.
Figure 12B:
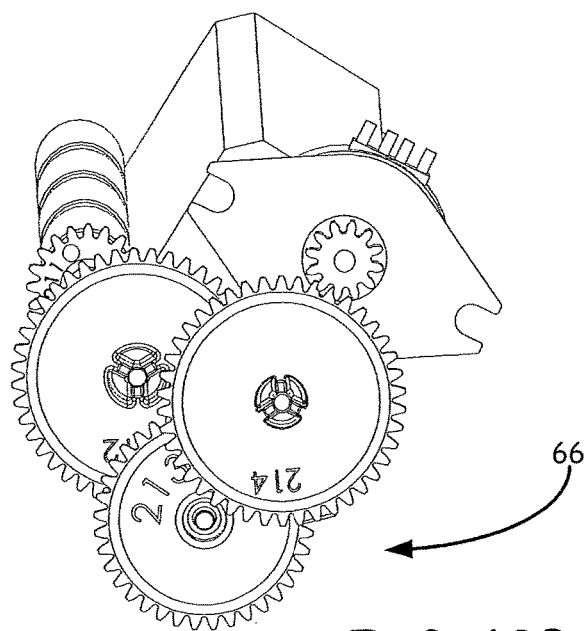
FIG. 12B is a perspective view of the scanner drive roller gear assembly of the gear train assembly of the device.

The main printing frame 16 is illustrated in FIGS. 7-10 is a frame supporting the printing, scanning and copying hardware. For example, the main frame 16 has a horizontal carrier track 38 extending along its width. As illustrated in FIG. 11A, a slidable bearing, or bracket, 40 is secured to the track 38. The bearing or bracket 40 is slidable along the track and as is discussed further below, holds a print head comprising a carriage 80 and ink cartridge 83 by a pivotal connection, which allows the carriage 80 to rotate about an axis perpendicular to the horizontal track 38. The bearing or bracket 40 also allows for a pivotal or rotatable connection of the carriage 80 to the bracket 40. The main frame 16 is configured along a front face with a scanning element 44 and scanning sensor 46 which extend horizontally across the main frame 16. In front of the sensor 46 and scanner 44 is a scanning roller 48. Scanner 44 is positioned in a forward or front length of the device. The scanner 44 extends along the length of the device and incorporates the sensor 46. The sensor 46 is a paper sensor having an optical component and lever arm device. FIGS. 12A-B illustrate a gear assembly 66 configured for driving the scanner roller. When paper is fed into the scanner 44 a slotted optical sensor determines the presence of the paper for scanning and activates the rollers to feed the paper through the scanner slot for scanning. The paper for scanning is inserted through a scanner slot located along the front face of the device, is scanned, and is fed out of the device on the front face, from just below the scanner 44.

Figure 12C:
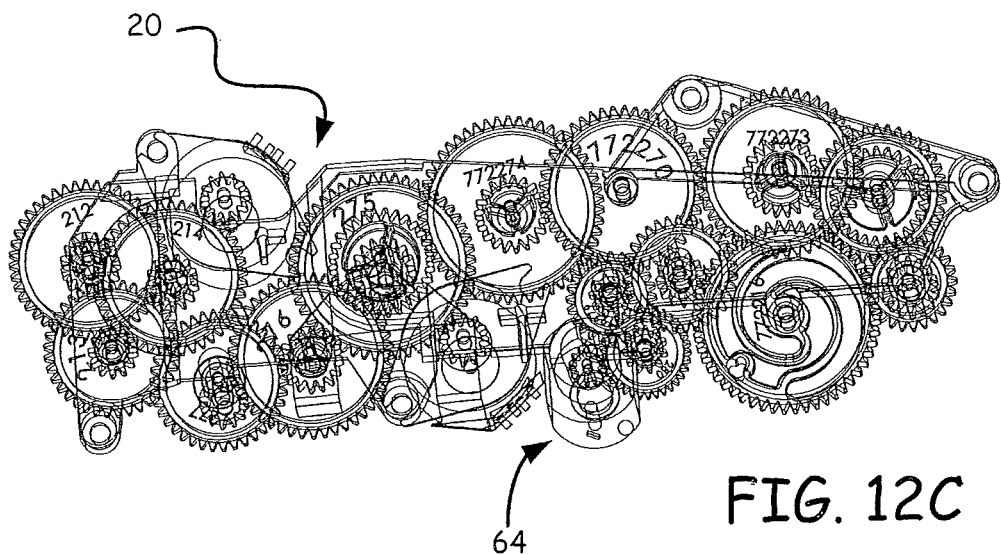
FIG. 12C is a front view of a gear train assembly of the device.

Along a bottom face of the main frame near the front of the frame is a paper ejection roller 50. Rollers 48 and 50 are similarly configured in that each roller comprises a bar extending across the main frame 16 having a plurality of spaced apart rubber rollers configured to rotate with the bar when the bar is rotated. The rubber rollers frictionally engage the paper to feed the paper as the rollers are driven, or rotated. The rubber roller may be a single length of rubber roller extending substantially along the bar a length approximately equal to the width of a standard sheet of paper. In the embodiment illustrated, the rollers 48 and 50 instead comprise a plurality of shorter rubber roller sections, 48b and 50b respectively, spaced apart along a bar and each bonded to the shafts 48 and 50. The lengths of the rubber rollers and number of rubber rollers may vary. For example, the scanner roller 48 may comprise anywhere from one to four or more equally spaced rubber rollers 48b extending substantially across the bar while ejection roller 50 may comprise anywhere from one to five or more, shorter rubber rollers 50b extending substantially across the eject roller shaft. The gear train 20 and a gear assembly 70 for driving each of the rollers 48 and 50 is illustrated in further detail in FIGS. 12C-E.

The main frame 16 is further adapted with two spaces 52 and 54, each configured to receive a motor for powering the hardware. The device utilizes at least two drive motors 56 and 58 wired in series, the motors being electronically synchronized and wired through the same circuit. The use of two motors, rather than one motor, in printing devices actually allows for physically smaller motors, for example small DC motors, to power the device. The motors are smaller in power and dimension, which contributes to the overall compactness and reduction in size of the device. The use of two motors wired in series also requires less battery power than the use of a single motor and an idler roller.

Figure 13D:
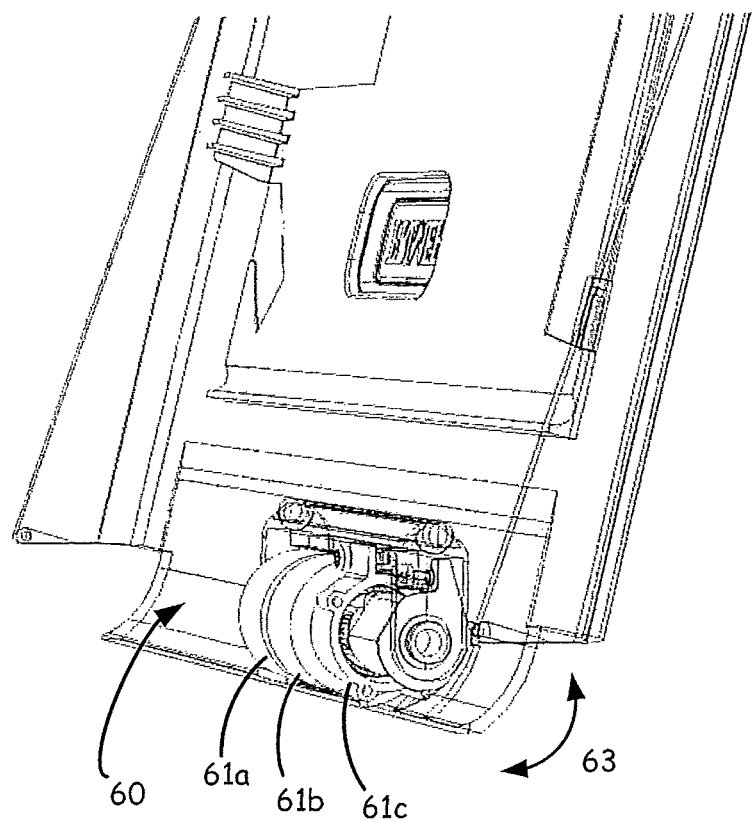
FIG. 13D is a side view of the pivoting sheet feeder roller of the device.

A back side of the main frame 16 is configured to receive an optional battery and also supports an auto sheet feeder assembly 60. The device is configured for both an electrical connection to an external power source and a battery power source. For example, a lithium ion battery may optionally be used to power the device. FIGS. 13A-B illustrate the auto sheet feeder 60 which is positioned horizontally along the back of the main frame 16 and is a feeder rotationally supporting two larger rubber coated rollers 61a and 61b, a gear set 61c which may comprise a modified planetary gear set where a larger outer gear is operably connected to three or more small gears, where the small gears are compound gears operable to drive the larger outer gear and at least one ring gear operably connected to the gear set. The gear set may provide a gear reduction of approximately 100 to 1 and where the small driven gears are offset by one tooth such that the small gears rotate approximately 42 times per revolution of the at least one ring gear. A small DC motor 62 for example, of the type and size commonly used with model cars, is connected to run the gears which in turn power the sheet feeder 60.

The auto feeder is secured at a paper infeed opening allowing the automatic feeding of paper into the main frame 16 for printing. The sheet feeder 60 may be a pivoting sheet feeder. The sheet feeder 60 and roller 61a and 61b are pivotally coupled to the printer frame such that the rollers 61a and 61b are pivotal into and out of the paper path of the printer. The rollers 61a and 61b are thus easily pivotable about the coupling in order to apply additional force to a sheet loaded into queue for printing. The feeder 60 and rollers 61a and 61b are pivotable towards the paper feed slot in order to contact the paper, or essentially grab the paper, and thus push the paper downwardly and into the printer as illustrated by arrows 63. Once the paper sheet is fed into the printer, the sheet feeder 60 is then pivoted in an opposing direction, or back into the printer, to release the paper. The feeder 60 thus pivots to a feed position to contact the paper and feed the paper into the printer while pivoting back to a position within the printer to release the sheet once it is fed to the print rollers, allowing the sheet to be fed through the printer for printing. The pivotable coupling allows the sheet feeder 60 to function as a sprag or one way freewheel clutch with respect to the sheets of paper in queue for printing. The paper can be pulled in when engaged in the print rollers because the planetary gear set is allowed to pivot up and release the paper.

Referring back to FIG. 3B, the device may further comprise a sheet bypass feeder component 65. An opening 65b extends along the length of the back side of the device 10 near the base of the device 10. The bypass feeder design opening allows various substrates to be fed into the printer for printing in a substantially flat manner through the opening 65b. When paper is fed into the printer through the bypass component 65, additional paper or substrate may remain in queue for later printing in the paper feed support. The bypass component 65 allows a substrate to be fed into the printer without using the auto sheet feed roller or being fed from a vertical position to a horizontal position in the printer. Instead, the sheet is fed through the bypass feeder directly into the printer in a horizontal manner, Thus, the bypass opening 65 is effective for printing on various substrates, for example, the substrate may be paper stock of increasing thickness, photo paper or various other substrates. The bypass opening 65 allows these substrates to be printed without utilizing the paper feed support as disclosed above in order to avoid jams or bending the substrate for printing.

Figure 12D:
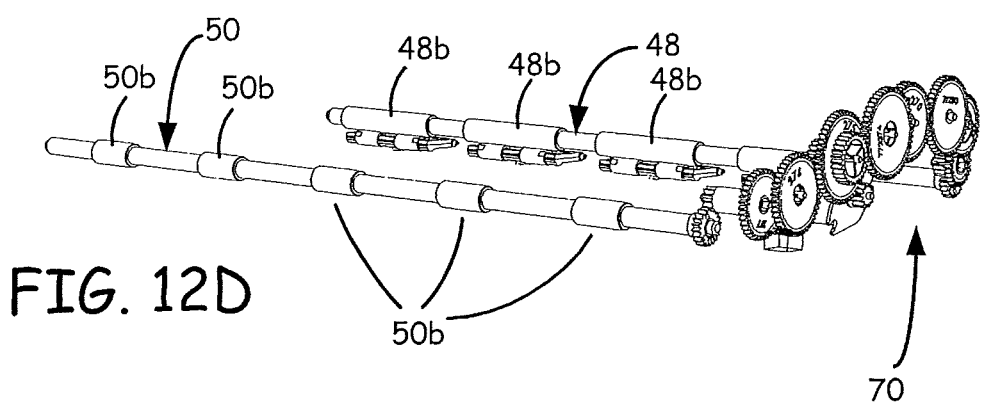
FIG. 12D is a perspective view of a drive roller gear assembly of the gear train assembly of the device.
Figure 12E:
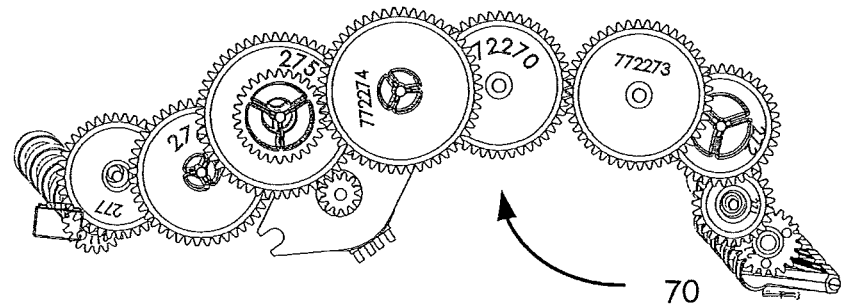
FIG. 12E is a front view of the drive roller gear assembly of the gear train assembly of the device.

The device of the present invention for example, may accommodate up to ten (10) sheets of standard paper at a time, the paper in queue for printing. At least one side length of the main frame 16 is also adapted on an outer surface with a gear train and small stepper motor assembly 64 for the rotating hardware and driving the rollers to feed the paper through the device. For example, the gear train 20 may comprise twenty gears operably connected to drive the rollers. The gear train 20 is illustrated generally in FIG. 12C, while FIGS. 12D-E illustrate the gear train assembly connected to and configured for rotating the drive rollers 48 and 50. A plurality of star wheels 49 positioned near the rollers aid in allowing the drive rollers 48 and 50 to cooperate and to feed paper through the device by holding paper or other substrates for printing, scanning and/or copying down against the rollers.

Figure 14:
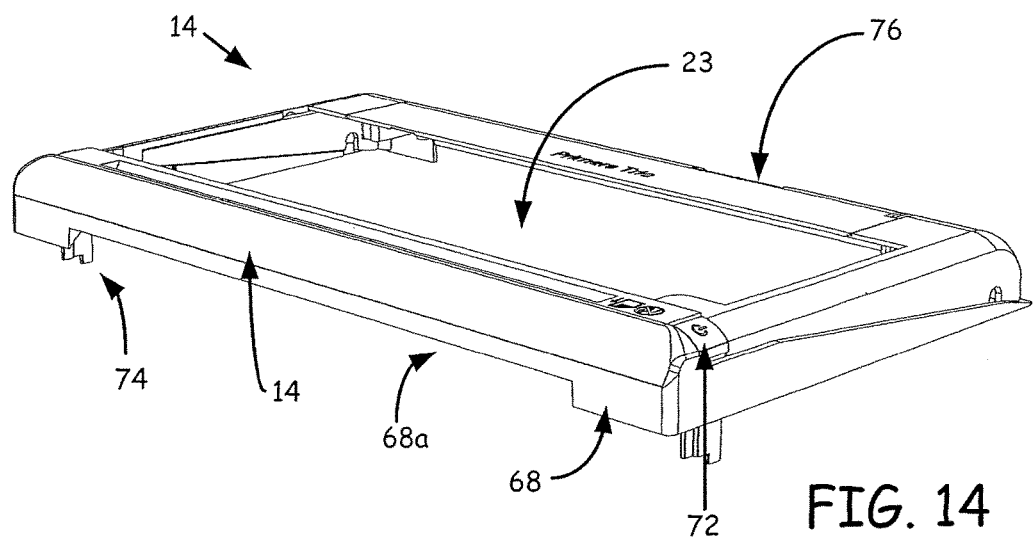
FIG. 14 is a perspective view of a cover frame of the device.

A cover frame 14 is illustrated in FIG. 14 and is configured for attachment on top of the base frame 12 and main frame 16, which is positioned on the base frame 12. The cover frame 14 is a perimeter cover having a substantially open top area 23. The open top area 23 exposes a print head as well as the maintenance system 36 and surrounding print area within main frame 16. Sides of the cover frame 14 are adapted for connection with sides of the base frame 12. The cover frame 14 is generally of the same perimeter shape with integral downwardly extending side walls which provide an upper perimeter to the housing. Front edge 68 and back edge (not shown) of the cover frame 14 are each configured with a recessed horizontal length 68a which provide openings in the front and back of the housing allowing paper to be fed into the housing 10 and through the main frame 16 for printing, scanning or copying. The cover frame 14 is attached to the base frame 12 with screws, allowing for assembly and access to the main frame 16 and all components therein as well as the power components positioned within the housing 10 on the base frame 12.

Cover frame 14 is further adapted with control button switches 72 and 74 and a battery cover plate 76. The battery cover plate 76 is a removable section along the back length of the cover frame 14, allowing the optional battery to be accessible without removing the cover frame 14. The control button switches 72 and 74 provide power control and function control selection to the user.

Figure 15:
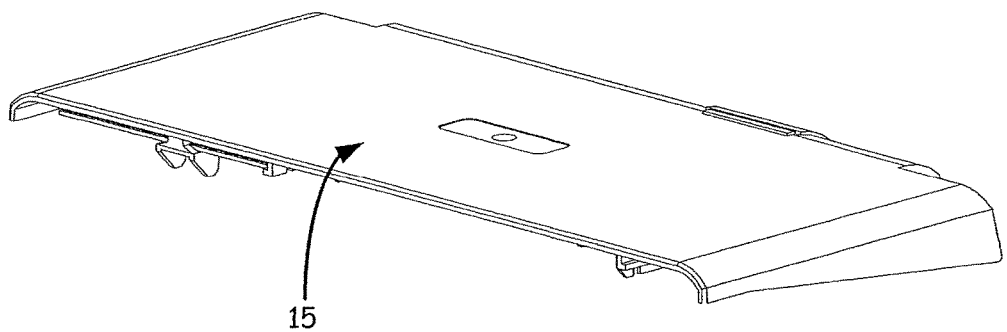
FIG. 15 is a perspective view of a paper feed cover of the device.
Figure 16:
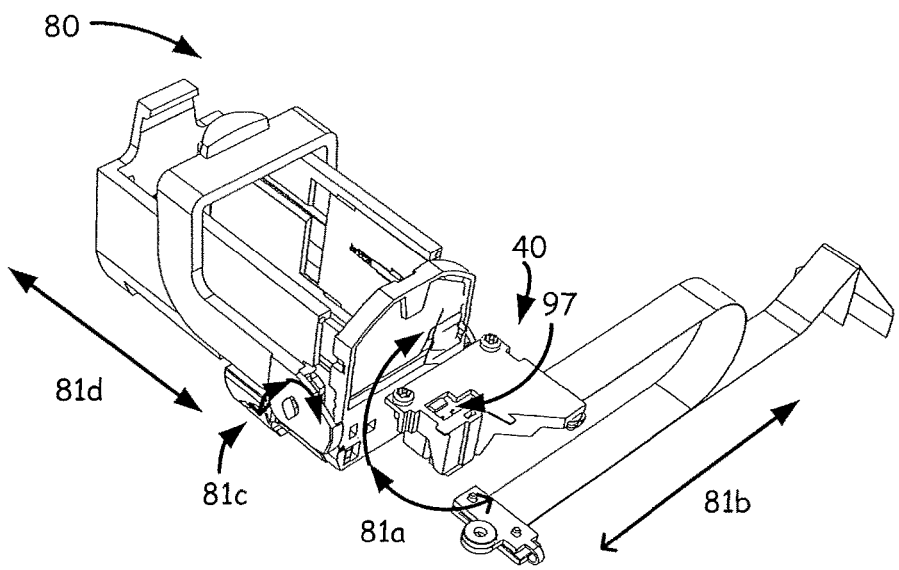
FIG. 16 is a perspective view of a rotatable carriage of the device.
Figure 17:
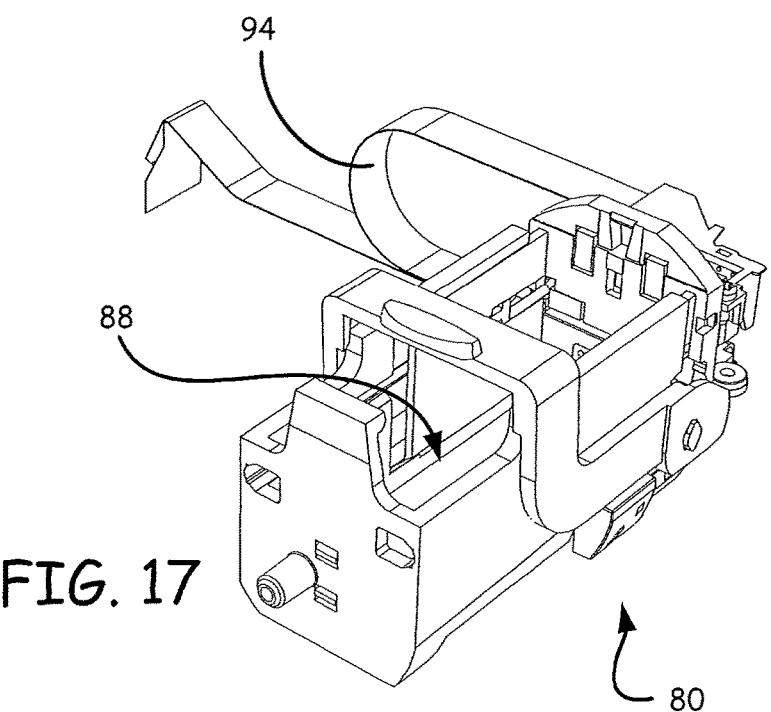
FIG. 17 is a back perspective view of the rotatable carriage of the device.
Figure 18:
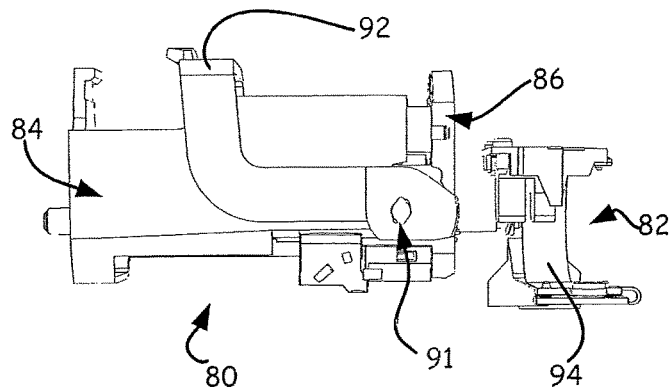
FIG. 18 is a side view of the rotatable carriage of the device.
Figure 19:
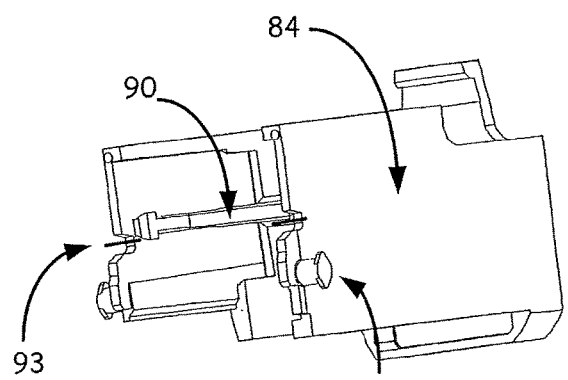
FIG. 19 is a perspective view of a frame section and pivotal connection point for the frame section and an actuation lever of the extensible carriage of the device.
Figure 20:
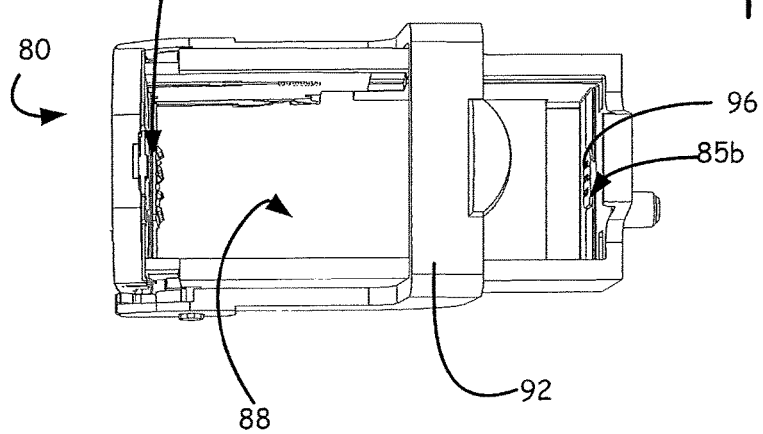
FIG. 20 is a top view of the rotatable carriage of the device.
Figure 21:
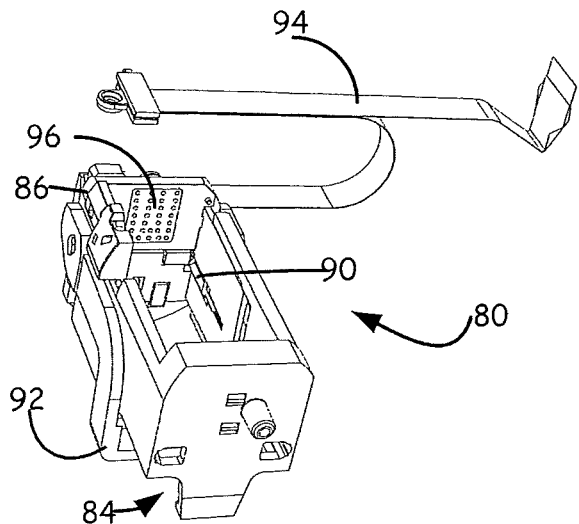
FIG. 21 is a front bottom perspective view of the rotatable carriage of the device.
Figure 22:
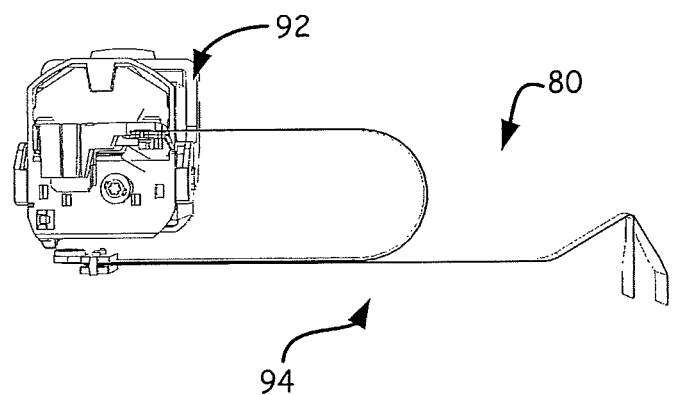
FIG. 22 is a back view of the rotatable carriage of the device.
Figure 23:
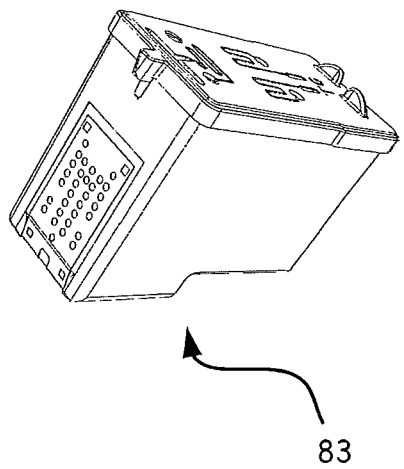
FIG. 23 is a perspective view of an ink cartridge of the device.
Figure 24:
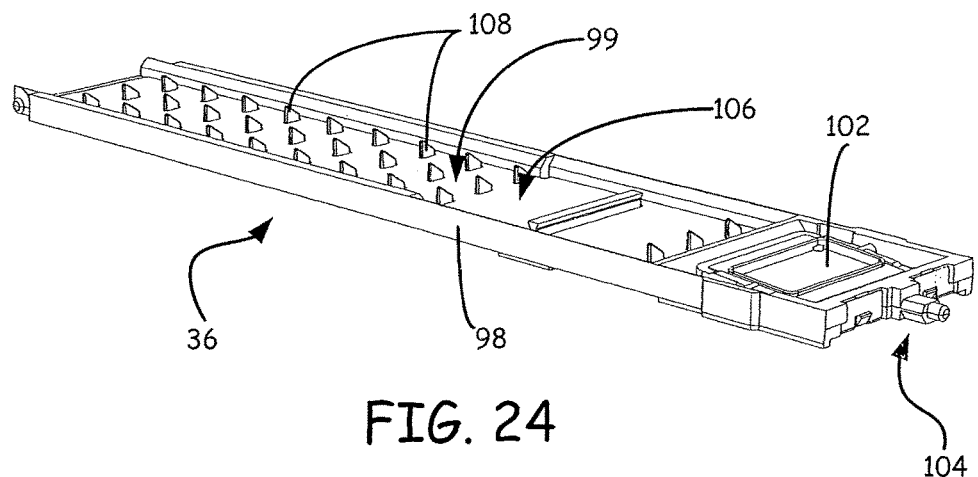
FIG. 24 is a perspective view of a removable maintenance tray of the device.
Figure 25:
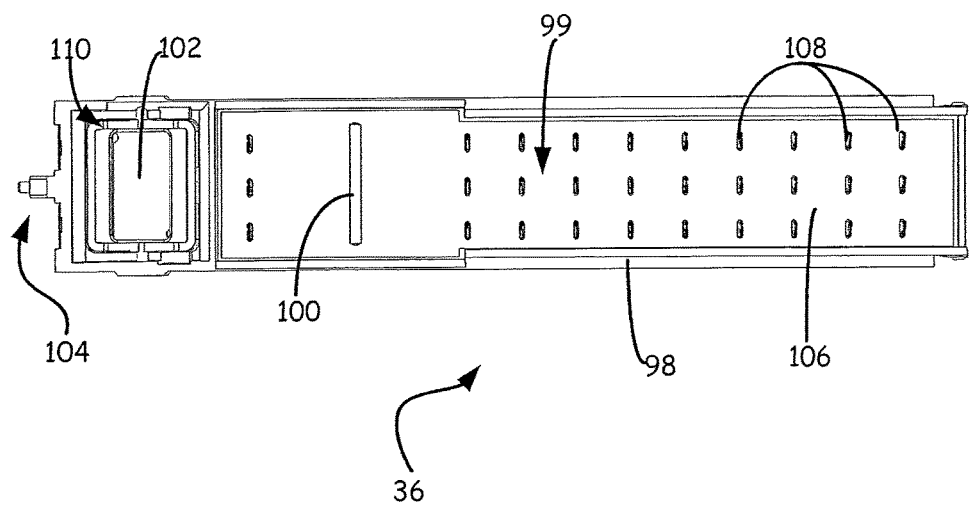
FIG. 25 is a top view of the removable maintenance tray of the device.
Figure 27:
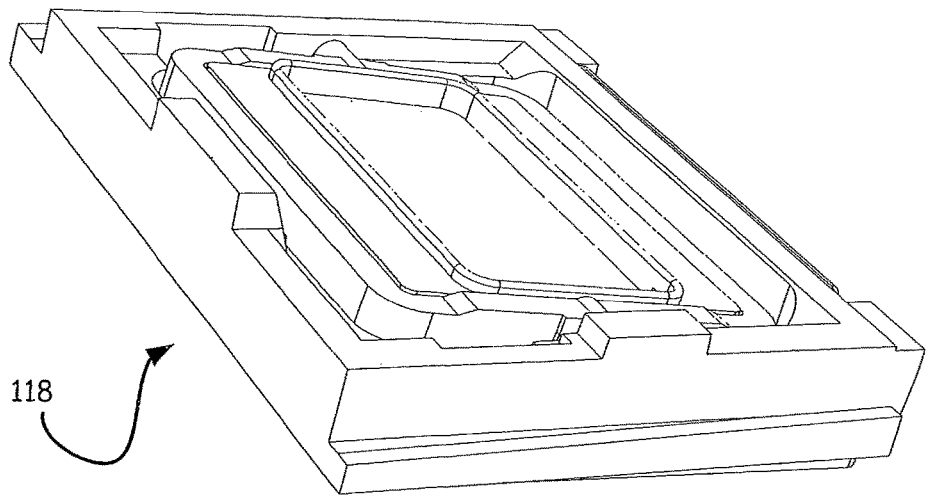
FIG. 27 is a perspective view of a storage cap assembly.
Figure 28:
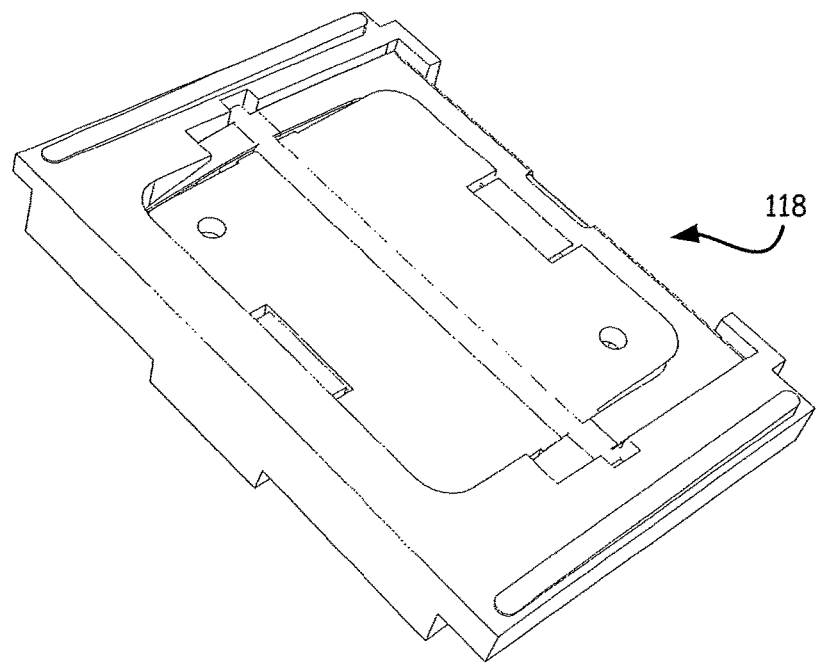
FIG. 28 is a bottom perspective view of the storage cap assembly.

The cover frame 14 is also adapted for connection with a housing cover 15 as illustrated in FIG. 15, which may be pivotally attached along a rear length allowing the cover 14 to be opened to expose the components of the device within the housing 10. Cover 15 is further adapted on an inner facing surface with a sub cover 44, which is pivotally attached to cover 15, allowing the sub cover 44 to be rotated or flipped upwardly, approximately 180 degrees, to a paper support position extending above cover 15. The cover 15 can be closed to substantially cover the cover frame 14 including the open portion 23 of the cover frame 14. Thus, the cover 15 can be opened for use of the device and closed for storage and/or transport.

FIGS. 16-23 illustrate a print head having a pivotal and extensible carriage 80 configured to receive an ink cartridge 83 for printing. The carriage 80 comprises a displaceable frame section 84 and a horizontally fixed frame section 86 that are slidably connected. The displaceable frame section 84 is horizontally slidable into and/or away from the fixed frame section 86 allowing a user to increase or decrease an internal length of an opening 88 of the carriage. The slidable connection is configured with at least one bias spring 90 where the bias spring 90 contracts when the lever is rotated upwardly to expose opening 88 of the carriage 80. The lever 92 is then rotated down to a closed position over the opening 88 by extension force of the spring 90 such that as the spring is extended, the length of carriage is contracted by rotation of the lever 92 and thus pulling inwardly the displaceable frame 84. The carriage 80 is then slidably secured to the horizontal track 38 enabling bi-directional linear movement along the direction of arrow 81b of the print head along the x-axis.

The carriage 80 is open along an upper and lower length, allowing an ink cartridge 83 to be inserted into the carriage 80 with the ink dispensing port of the ink cartridge 83 exposed for printing. To insert or remove an ink cartridge 83, the carriage 80 has an actuator arm or lever 92. The actuation lever 92 is pivotally secured to the carriage 80 along displaceable frame section 84. The actuation lever 92 is rotatable about a first axis illustrated by arrow 81c. The actuation lever 92 extends upwardly and over the opening 88 of the carriage 80, the opening being an open area configured for receiving an ink cartridge 83. Thus, the lever 92 is pivotal or rotatable about the first axis 81c, to provide access to the carriage 80 for an ink cartridge 83. The first axis allows the lever 92 to move, or pivot, between an opened or raised position and a closed or lowered position. The actuation lever 92 is pivotally attached to the displaceable frame section 84 in a manner that simultaneously results in slidably extending a displaceable frame section 84 away from the stationary frame section 86 along the direction of arrow 81d when the lever 92 is moved from the closed to the open position. Conversely, when the lever 92 is moved from the open to the closed position, the displaceable frame section 84 is moved towards the fixed frame section 86 by spring or springs 90.

The lever 92 is secured to the carriage 80 on the pins 91. A pair of small connecting pins 93 are protruding from lever 92 and are positioned in the carriage just above the connection point of the lever to the frame such that when the lever is lifted upwardly to open and extend the carriage 80, pins 93 contact the frame to create a caroming action to push displaceable frame 84 outwardly and to propel sliding of the displaceable frame 84 to extend the length of carriage 80 while contracting the springs 90. When the lever 92 is rotated to the closed position, releasing the lever 92 from the open position allows the springs 90 to extend and thus act on the displaceable frame 84 to propel the displaceable frame 84 into a contracted or closed position with the stationary frame 86. Thus the springs are extended in the closed position.

The open area 88 is then a size configured for easily receiving or removing the ink cartridge 83. When the lever 92 is lowered and closed, the displaceable frame section 84 is contracted inwardly towards fixed frame section 86, through extension of the compressed springs 90 and closing the carriage 80. The carriage may be closed around an inserted ink cartridge 83 and thus the lever 92 folded down and over the ink cartridge 83. This procedure secures the ink cartridge 83 in the carriage 80. Moreover, the lever 92 is automatically secured and locked in the closed position. This further secures the ink cartridge 83 in the carriage and also provides enough force between the frame sections 84 and 86 to ensure electrical contact between the ink cartridge 83 in the carriage 80 and the electrical contact for enabling printing. Two rubber pads 85a and 85b, one rubber pad positioned behind the electrical contact and the second rubber pad positioned near the front of the cartridge 83 in the carriage 80 provide opposing forces to ensure contact between the ink cartridge 83 and the electrical contact.

The carriage 80 is also pivotal about a second axis, which is a rotational axis. The second axis allows the carriage 80 to be rotated or pivoted from an upright position to a sideways position. Referring back to FIG. 2, the second axis also allows the carriage 80, whether or not an ink cartridge 83 is inserted into the carriage, to rotate about an axis perpendicular to the axis of linear movement of the print head, the rotation being along arrow 81a. The secondary axis allows the carriage 80 to be pivoted to a compact and stowed position 114, where the carriage is rotated to its side. The compact position 114 allows the cover to be fully closed on the device and further reduces the dimensions of the device, providing a more compact device suitable for travel or storage. The carriage 80 is then pivotal or rotatable to an upright position, or printing position 116. The upright position also allows for inserting and removing a cartridge 83 into the carriage 80 and allows the cartridge 83 to be used for printing. Additionally, cleaning, maintenance, and capping the cartridge 83 for temporary storage, are performed with the cover open.

Thus, when stowed, the carriage 80 is rotated on a side, allowing the carriage 80 to retain an ink cartridge 83 if desired while stowed. The stowed position 114 allows the cartridge 83 to be lowered, allowing the cover 15 to be fully closed over the housing 10 resulting in a compact device. When preparing for use, the cover 15 is opened and as the cover frame 14 has an open top to provide access to the main frame 16, the carriage 80 can be rotated to an upright position 116 for printing. In this position, the carriage 80 and the ink cartridge are positioned and extend upwardly from and above the main frame 16. The carriage 80 is pivotally connected to the bearing or bracket 40 that is slidably secured to the track 38, allowing the carriage 80 to be rotatable about the second axis and linearly displaceable along a perpendicular axis for printing and maintenance functions.

Figure 11B:
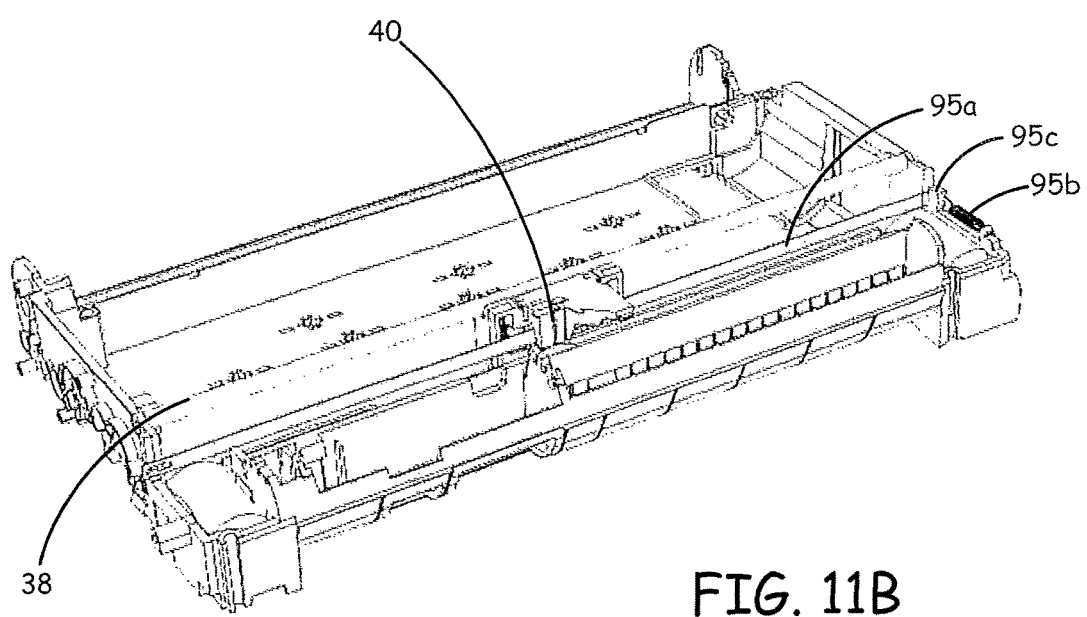
FIG. 11B is a perspective view of the bracket, shaft and an encoder strip secured to the main frame of the device.

A flexible circuit 94 extends from a first contact panel 96 inside the carriage 80 to the bracket 40, where an aperture in the bracket 40 provides exposure of a second sensor 97. The flexible circuit allows the linear and rotational movement of the carriage 80 and the ink cartridge 83 without damaging the circuit or the sensors. The circuit 94 extends outwardly from the bracket 40 and folds or bends in the flexible circuit 94 to accommodate the positioning and pivoting of the carriage 80. An encoder strip 95a (referring back to FIG. 11B) may pass through the bracket 40 and is mounted to the frame allowing the encoder strip to extend across the housing substantially along the carrier track 38. The encoder strip 95a is optically coupled to an optical sensor housed within the bracket 40. The encoder strip 95a is attached to the frame on one side and with, for example, a substantially 90 degree bend in the encoder strip 95a to a spring extension 95b, and positioned perpendicular to the encoder strip and along one side of the frame. This arrangement and bend 95c in the encoder strip allows the device housing 10 to be further compact in size. The encoder strip may include bends or folds of up to and including approximately 90 degrees, which allow the strip to connect the frame and the carriage in a compact manner.

The printing position is a position where the ink cartridge 83 is secured in the carriage 80 and the carriage 80 is pivoted to an upward position so that the ink dispensing port of the ink cartridge 83 is exposed in the downward direction for printing. When the carriage 80 and the cartridge 83 are in the printing position, the carriage 80 has been compacted in length, also allowing electrical contact between the ink cartridge 83 and the first contact panel, completing the electrical circuit for dispensing of ink from the cartridge 83.

FIGS. 24-28 illustrate the ink maintenance system 36 of the device. The ink maintenance system 36 is a tray 98 configured to hold an absorbent material or pad 99 and having a wiper 100 as well as a cap assembly 110. The maintenance system 36 is easily removable from connection with the base frame 12 for disposal and replacement of the maintenance system 36, or alternatively for easy user replacement or cleaning of the tray 98, absorbent material 99 or cleaning of the wipe ledge 100 and/or cap 102 components. Opening 19 in the base frame 12 allows the maintenance system 36 to be removable from the device. A tool or other small diameter instrument may be inserted into the aperture 19 from outside of the device housing 10, when inserted into the aperture 19, the tray 98 is released from secured connection to the base 12 and device. The tray 98 can then be taken out and disposed of, and replaced with a new tray 98, as required.

The tray 98 may be exposed when the cover 15 is open for easy access. The tray 98 is substantially flat and generally rectangular in shape. A gear assembly 112 for lifting and lowering the tray is illustrated in further detail in FIGS. 26A-C. A first end 104 of the tray 98 is adapted for a secure and removable connection with a spiral shape cam gear 112a in the main frame 16 as illustrated in FIG. 26C. The tray is also connected to the power source of the device through connection 104 which allows the tray 98 to be raised and lowered for cleaning functions as described in further detail below. The tray 98 is positioned on the base frame 12 extending along the horizontal track and below a horizontal travel path of the print head.

The tray 98 has a first end holding a spring loaded maintenance cap 102 which may be a rubber cap for the ink cartridge 83. Spaced from the cap 102 along the tray 98 is an upwardly extending ledge 100 across the width of the tray 98. The ledge 100 may be a rubber ledge or wiper. Further along the tray is a substantially flat base area 106 for receiving the absorbent material 99. The absorbent material 99 may extend along the length of the base 106, allowing a sufficient amount of absorbent material or pad 99 to be exposed to the ink cartridge 83 when passed linearly over the tray 98. The absorbent material 99 is secured to the base 106 of the tray 98 and is disposable once the material 99 has accumulated ink waste. The base area 106 of the tray 98 is also adapted with a plurality of upwardly extending separator units 108 spaced apart on the base 106. The absorbent material 99 is configured to allow these separator units 108 to extend through and above the material 99. These units 108 prevent paper being fed through the device from contacting the absorbent material 99, which accumulates waste ink during cleaning. As the maintenance system 36 is positioned under the travel path of paper during printing, the separator units 108 provide a spacer for paper being fed through the main frame, passing the paper over and above the absorbent material without making contact.

When a soft "power down" transition has occurred, or the device is placed in a "sleep" or "hibernate" mode, the carriage 80 may be moved horizontally along the device to a side end of the device near the cap assembly 110 of the maintenance station 36 and then the maintenance station 36 is lifted up into position to seal and an cap the cartridge. When powered on, the maintenance station 36 is lowered and the cartridge is uncapped and the print head is moved horizontally to a read position on near the center of the device or an off-set center position. When maintenance is required, the tray 98 is automatically raises towards the print path and to a height allowing the ink cartridge 83 to contact the wiper 100 and cap 102. The cap 102 and cap assembly 110 are illustrated in further detail in FIGS. 24-25. The print head is then passed over the tray 98 wherein the ink dispensing ports of the ink cartridge 83 are activated along the length of the absorbent material 99 to remove residual ink. The ports are then passed over wiper ledge 100 for further ink removal and cleaning. Referring back to FIG. 2, when powering off the device completely, or when a hard power down transition occurs for storage of the device, the cartridge 83 and carriage 80 are moved horizontally to a left side of the device into a lock position, allowing the carriage 80 to rotate around axis along arrow 81a for storage in the stowed position. A storage cap assembly 118 is positioned within the main frame 16 (referring back to FIGS. 1-2) along a side wall such that when the cartridge 83 is in the stowed position 114, the cartridge 38 is in contact with the storage cap assembly 118. The storage cap assembly 118 is illustrated in further detail in FIGS. 27-28, the cap being contactable with the ink dispensing ports of the cartridge 86. When stowed, the cartridge 83 is compressed against the cap assembly 118 allowing the cap to cover and seal the ink dispensing ports, thus protecting and preserving the cartridge contents (ink) when stored. The device may then be stored in this manner, and the carriage further positioned for rotation about the second axis to further compact the device and allow for full closure of cover 15.

The maintenance station 36 is further operable such that when the device is powered on, the tray 98 is automatically lowered with respect to the base 12 and away from the ink cartridge 83 and print head. The ink cartridge 83 is then released from the cap 102, which is lowered with the tray 98. The print head is then moved horizontally to the printing position and may subsequently be used for printing.

The device is configured for wireless and/or wired connection to a laptop computer, tablet, portable device or other computer for receiving print, scan and/or copy instructions and commands. The device is a three-in-one device, capable of scanning documents, copying documents and printing documents. All of the software and hardware components required for these functions are disposed within the housing and the attached device, wherein the housing is compact for travel and portability.

Although the present disclosure has been described with reference to preferred embodiments, workers skilled in the art will recognize that changes may be made in form and detail without departing from the spirit and scope of the disclosure.

The invention claimed is:

1. A printing device having an auto sheet feeder comprising one or more rollers to engage and feed paper sheets into the printer device and a substrate feed opening for a substrate having a thickness different than the paper sheets and for directing the substrate directly into and through the printer, the substrate feed opening being disposed in a generally horizontal position and being configured to permit the substrate to bypass the auto sheet feeder, wherein the auto sheet feeder is pivotally movable to a position to permit the substrate to be fed into the printing device through the substrate feed opening.

2. The printing device of claim 1 wherein the substrate feed opening is configured to direct substrates having a thickness greater than the paper sheets without bending the substrate.

3. The printing device of claim 1 wherein the substrate feed opening is configured to avoid paper jams.

4. A printing device having a frame, a printer component and a sheet feeding system for feeding sheets to the printer component, the sheet feeding system comprising:
   a sheet infeed opening for sheets to enter the frame for printing;
   a sheet feeder for guiding sheets to the printer component, the sheet feeder being pivotally attached to the frame; and
   wherein the substrate sheet feeder pivots away from the sheet infeed opening to release the sheet once the sheet is fed to the printer component.

5. The printing device of claim 4 wherein the sheet feeder comprises at least one roller for contacting the sheet once the sheet is in queue for printing.

6. The printing device of claim 5 wherein the at least one roller is pivotal towards the sheet infeed opening to contact the sheet.

7. The printing device of claim 6 wherein the at least one roller is pivotal away from the sheet infeed opening to release the sheet from contact.

8. The printing device of claim 7 wherein the at least one roller is pivotal away from the sheet infeed opening into the frame.

9. The printing device of claim 5 wherein the at least one roller is providing rotational movement via a planetary gear set.

* * * * *